United States Patent [19]

Kuroki

[11] Patent Number: 4,677,724
[45] Date of Patent: Jul. 7, 1987

[54] HEAT EXCHANGER STRUCTURE AND METHOD OF MANUFACTURING SAME

[76] Inventor: Takanori Kuroki, 2-12-1, Hinosato, Munakata-shi, Fukuoka-ken, Japan

[21] Appl. No.: 741,535

[22] Filed: Jun. 5, 1985

[51] Int. Cl.$^4$ .................. B27D 53/02; B23P 15/26
[52] U.S. Cl. ......................... 29/157.3 R; 29/157.3 C
[58] Field of Search .................. 29/157.3 R, 157.3 A, 29/157.3 C, 157.3 D, 458, 463, DIG. 4, DIG. 48; 228/186, 183, 243, 248, 219, 217, 193, 263.18, 263.15, 221

[56] References Cited

U.S. PATENT DOCUMENTS

| | | | |
|---|---|---|---|
| 2,718,690 | 9/1955 | Ulam | 228/186 |
| 2,819,883 | 1/1958 | Rieppel et al. | 165/172 |
| 2,930,405 | 3/1960 | Welsh | 29/157.3 A |
| 3,267,563 | 8/1966 | Seaton | 29/157.3 A |
| 3,267,564 | 8/1966 | Keyes | 29/157.3 A |
| 3,670,397 | 6/1972 | Lewis | 228/221 |
| 3,980,220 | 9/1976 | Wolfe et al. | 228/221 |
| 4,072,262 | 2/1978 | Godrick et al. | 228/183 |

FOREIGN PATENT DOCUMENTS

| | | | |
|---|---|---|---|
| 0128385 | 10/1980 | Japan | 228/186 |
| 0026686 | 3/1981 | Japan | 228/186 |

OTHER PUBLICATIONS

Paton, et al, "Spontaneous Hermetic Sealing of Multilayer Blanks and Stacks During High Temperature Heating", Apr., 1980, Sou. Phys Dokl. 25(4), p. 304.

Primary Examiner—Mark Rosenbaum
Assistant Examiner—Irene Graves Golabi
Attorney, Agent, or Firm—Browdy and Neimark

[57] ABSTRACT

This invention relates to a heat exchanger structure in which a passage for the cooling or heating fluid is formed. The inner surface of the passage is roughened, and provided with a plurality of lengthwise-extending, inwardly-projecting, linear or spiral, continuous or intermittent fins. The cooling or heating fluid is passed through the passage to promote an increase in the heat exchange rate. In order to manufacture such a heat exchanger structure, a pipe provided on its inner surface with a plurality of lengthwise-extending, inwardly-projecting, continuous or intermittent fins is inserted between a plurality of complementary members to combine these parts in the shape of a mold. The exposed portions of the joint surfaces of these complementary members and such portions of the complementary members and pipe are then hermetically vacuum-sealed. The resultant complementary members and pipe are diffusion-welded unitarily by the hot isotropic pressure welding. A nickel plate or a nickel alloy plate or a stainless steel plate, which is laminated on the portion of the assembled parts which requires to have the wear resisting properties is also diffusion-welded at the same time.

1 Claim, 15 Drawing Figures

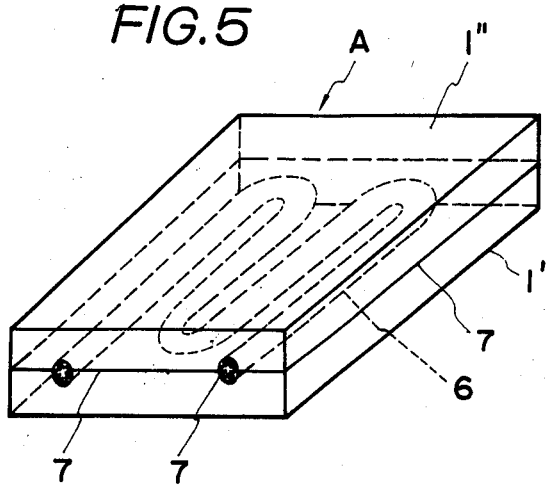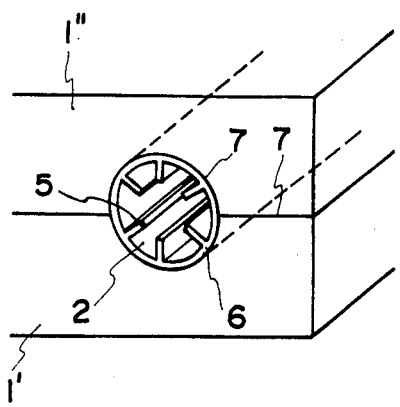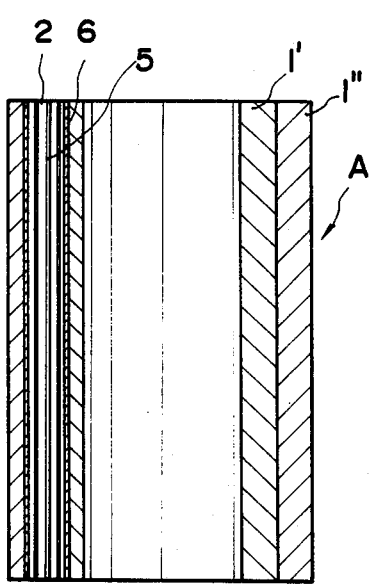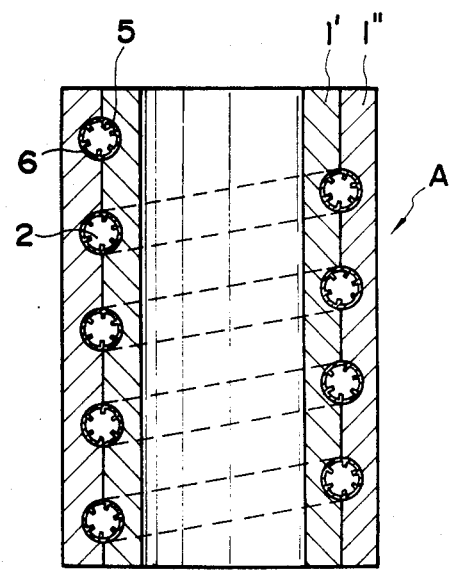

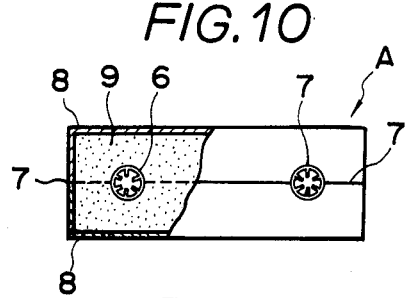
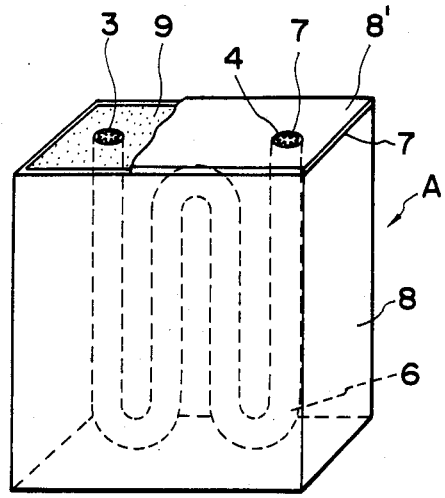
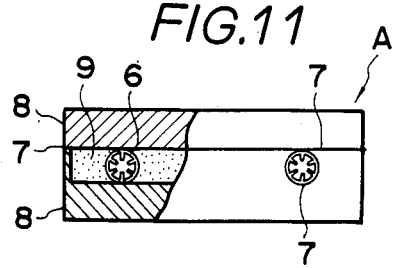
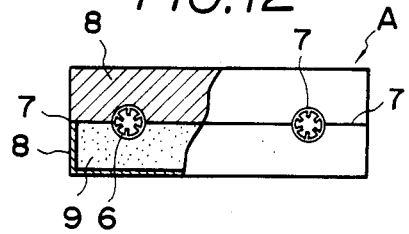
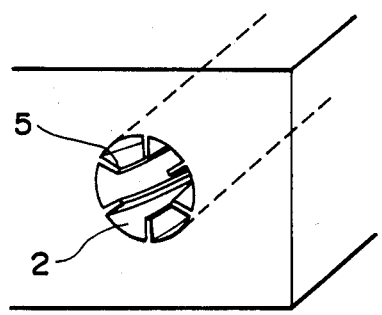
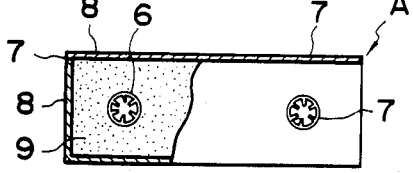
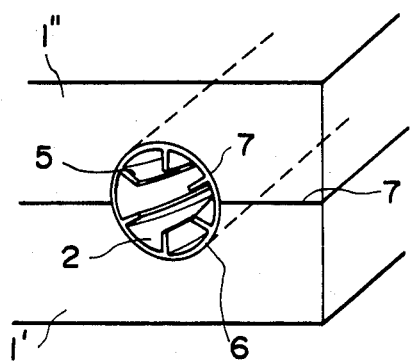

HEAT EXCHANGER STRUCTURE AND METHOD OF MANUFACTURING SAME

FIELD OF THE INVENTION

This invention relates to a heat exchanger structure, such as a mold for continuous casting, and a blade inlet, which must be cooled or heated, and which have in a heat exchanger structure body a completely-formed passage for a cooling or heating fluid; and a method of manufacturing such heat exchanger structures.

BACKGROUND OF THE INVENTION

A generally-used cooling system for, for example, a mold for a continuous casting is a system in which the cooling water is passed through a space formed between a recess, which is provided in the rear surface of a mold body, and a back frame. However, in this cooling system, a sufficiently high cooling efficiency cannot be obtained, and there is the possibility that the water may leak from a region between a back frame and a mold body. Moreover, it is difficult to provide this region with a seal for preventing the leakage of water therefrom. With a view to eliminating these inconveniences, a mold having a cooling water passage formed completely within a mold body has recently been proposed.

However, it is very troublesome to form such a cooling water passage in a mold of this construction. Therefore, a smaller number of larger-diameter bores is more often the case than a larger number of smaller-diameter bores. The larger the diameter of a cooling water passage, the more easily the cooling water flowing therethrough separates into supernatant, intermediate and bottom layers. This causes a great decrease in the cooling efficiency.

OBJECT OF THE INVENTION

An object of the present invention is to provide a heat exchange structure, such as a mold for continuous casting, which is capable of solving these problems; and a method of manufacturing such heat exchanger structures.

BRIEF DESCRIPTION OF THE DRAWINGS

FIGS. 3-6 illustrate a manufacturing method according to the present invention, wherein:

FIG. 3 is a perspective view of separate members of a mold;

FIG. 4 is a perspective view of a pipe; and

FIG. 5 is a perspective view of the separate members and pipe combined together.

FIG. 6 is a perspective view of a principal portion of a product of the method;

FIGS. 7 and 8 are sectional views of further examples of heat exchanger structures;

FIGS. 9-13 are partially sectioned views illustrating some other manufacturing methods according to this invention;

FIG. 14 is a perspective view, which corresponds to FIG. 2, of a further embodiment; and FIG. 15 is a perspective view, which corresponds to FIG. 6, of a further embodiment.

DESCRIPTION OF THE EMBODIMENTS

Figure 1:
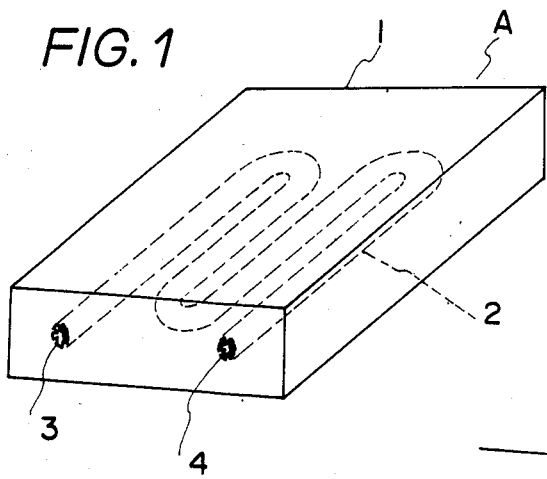
FIG. 1 is a perspective view of an example of a mold for the continuous casting.
Figure 2:
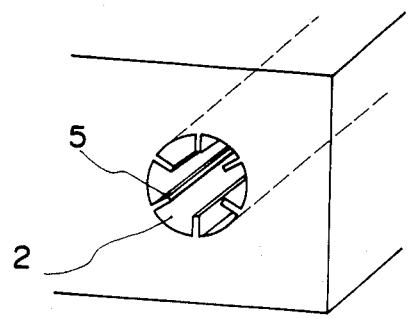
FIG. 2 is an enlarged view of a principle portion of the mold.
Figure 3:
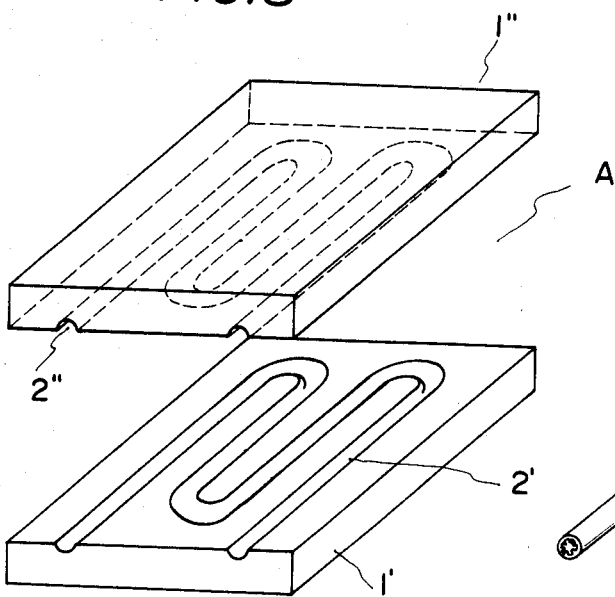

FIGS. 1 and 2 show a mode of embodiment of a mold, which constitutes a heat exchanger structure A, for continuous casting. In this embodiment, a cooling water passage 2 having at its both ends a cooling water feed port 3 and a cooling water discharge port 4 is formed so as to zigzag back and forth through the interior of a mold body 1 which consists of a material having a high heat conductivity, such as copper or a copper alloy.

The design of the cooling water passage 2 in this embodiment, in which the passage 2 extends so that a fluid can circulate over its whole length, can be modified in various ways. A mode in which a plurality of cooling water passages having cooling water feed ports and cooling water discharge ports at their respective lower and upper ends are formed independently of one another, and a mode in which a plurality of cooling water passages extending in a non-vertical direction and having their respective cooling water feed ports and cooling water discharge ports are formed can also be employed.

The inner surface of the mold body 1, i.e. the surface, which a melt or a solidified shell contacts, is provided additionally with a wear resisting protective layer consisting of nickel or its alloy. Accordingly, this mold is not different at all from the generally-used mold for continuous casting.

As shown in FIG. 2, which is an enlarged view of a principal portion the above embodiment, a plurality of lengthwise-extending fins 5, 5 . . . are formed on the inner surface of the passage 2 so that these fins project inward therein.

These fins 5 increase the area of the inner surface, which the cooling water contacts, of the passage 2, and enable the cooling efficiency to be improved. Hence, it is desirable to form the largest possible number of fins 5, 5 . . . that enables a required level of flow rate of the cooling water to be maintained, in such a manner that the fins project inwardly into the passage 2.

Each fin 5 may not necessarily be formed continuously over the whole length of the cooling water passage 2; it may be formed in a rack-like construction.

The inner surface of the passage 2 may consist of a rough surface having small particles thereon, or rough surfaces composed of stripes of minute projections and recesses. These rough surfaces enable the efficiency of heat conduction of the inner surface of the passage 2 to be greatly improved.

A method of manufacturing a mold for continuous casting, which is provided with these fins 5, will now be described with reference to FIGS. 3-6. First, two divisional members 1', 1" provided in one surface thereof with grooves 2', 2", which are to form a cooling water passage 2, are prepared. The inner divisional member 1' out of these two divisional members 1', 1" can be formed of copper or a copper alloy, which has high thermal conductivity, and the outer divisional member 1" stainless steel, which has a high strength.

Figure 4:
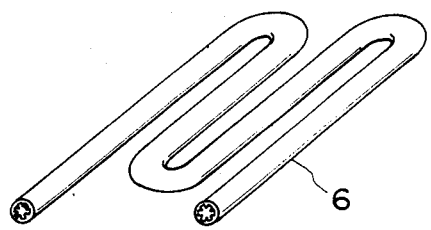

A pipe 6 shown in FIG. 4 is prepared, which is to be fitted in a space formed by the grooves 2', 2" when the divisional members 1', 1" are engaged at their respective grooved surfaces with each other.

This pipe 6 is provided on its inner surface with a plurality of continuous or intermittent fins 5, 5 . . . , which extend in the lengthwise direction of the pipe 6 and are spaced in the radial direction thereof, and which project inward so as to form a rack-like structure.

These divisional members 1', 1" and pipe 6 are then assembled with the pipe 6 fitted in the grooves 2', 2", as shown in FIG. 5. The peripheries of the portions of the joint surfaces 7 of the divisional members 1', 1" which are exposed to the outside, and the peripheries of the portions of the joint surfaces 7 of the divisional members 1', 1" and pipe 6 which are exposed to the outisde are then hermetically sealed. Sealing is effected by electron beam welding so that air is not left on the inner side of the seal.

The resultant product is then formed into a unit by hot isotropic pressure welding, in which the pressure of a required gas, such as a high-temperature and high-pressure argon is applied to the whole surface of the product.

Owing to this hot isotropic pressure welding, diffusion bonding occurs in the joint surfaces of the two divisional members 1', 1', and also between the pipe 6 and divisional members 1', 1" if the pipe 6 consists of a material which can be diffusion-bonded to the divisional members 1', 1".

The pipe 6 is generally formed of the same kind of material, i.e. copper or a copper alloy as the divisional members 1', 1", and the heat exchanger structure A is used with the pipe 6 and divisional members 1', 1" joined to one another unitarily. However, the pipe 6 may consist of any material.

The heat exchanger structure A may be formed in an arbitrary shape. For example, as shown in FIGS. 7 and 8, a heat exchanger structure may be formed by preparing double tube type cylindrical body consisting of inner and outer cylindrical members; and inserting a pipe 6 between the contact surfaces of these inner and outer cylindrical members so as to extend in the longitudinal direction thereof or spirally in the circumferential direction thereof, and thereby make a passage 2 for cooling water or steam.

In this case, if the two divisional members 1', 1", which consist of different kinds of metals, are diffusion-welded to each other unitarily with a member of a metal, which is a different kind from those of the divisional members 1', 1", held therebetween, the members of different kinds of metals which cannot normally be welded to each other become weldable. Such an additional metal member increases the bond strength of the divisional members of different metals even when these metals can be welded to each other welding of the metal members can be performed easily, and the efficiency of the operation is improved.

Some other methods of manufacturing molds for continuous casting, which is provided with fins, will now be described with reference to FIGS. 9–13. First, as shown in FIG. 9, in a metal box 8, which is opened at its upper side only, and which has an outer shape similar to that of a desired mold, a pipe 6 is inserted so that the pipe 6 extends along a space in which a cooling water passage is to be formed.

This pipe 6 is provided on its inner surface in the same manner as in the previously-described embodiment with a plurality of continuous or intermittent fins 5, which extend in the lengthwise direction of the pipe 6 and project inwardly into the pipe, and which are spaced in the circumferential direction thereof.

The space between the outer surface of the pipe 6 and the inner surface of the metal box 8 is then filled with aggregate metals 9, such as metal powder, metal particles, metal wires and metal plates. The opening at the upper side of the metal box 8 is closed with an upper plate 8' thereof with the opened portions of the pipe 6 left as they are. The resultant product is diffusion-welded unitarily by the hot isotropic pressure welding with the joint portions 7 of the metal box 8 and upper plate 8' and the joint portions of the upper plate 8' and the circumferential surfaces of the end portions of the pipe 6 kept sealed airtight.

During this hot isotropic pressure welding operation, the metal box 8 and upper plate 8' and the aggregate metals 9, and the aggregate metals 9 and pipe 6 are unitarily combined.

The material of the pipe 6 in this embodiment is identical with that of the pipe in the previously-described embodiment.

Of course, the outer shape of the metal box 8 may be determined arbitrarily as in the previously-described embodiment. Also, the mode of dividing the mold body, and the thickness of the walls thereof may be determined arbitrarily as shown in FIGS. 9–13.

In a further embodiment, a principal portion of which is shown on an enlarged scale in FIG. 14 which corresponds to FIG. 2, the fins 5, 5 . . . on the inner surface of a passage 2 are formed so as to extend in a spirally-twisted state in the lengthwise direction of the passage 2.

These fins 5 cause the area of the inner surface, which the cooling water contacts, of the passage 2 to be increased, and also the cooling efficiency to be improved, in the same manner as in the previously-described embodiment. The fins 5 also perform the function of swirling the cooling water which flows in the passage 2 along the spirally-twisted surfaces thereof. Therefore, it is desirable that the largest possible number of fins which enable a required flow rate of cooling water to be maintained be provided. The angle of twist of the fins may be arbitrarily determined but, if it is too large, the cooling water does not flow smoothly. Accordingly, a suitable angle of twist of the fins is 5°–10°.

The fins may not necessarily be formed continuously over the whole length of the cooling water passage 2; they may be formed intermittently in the same manner as in the previously-described embodiment.

The methods of manufacturing the molds for the continuous casting of these embodiments are not substantially different from those of the same embodiments. For example, the mold shown in FIG. 6 can be manufactured in the same way as the mold shown in FIGS. 3–5, and the manufacturing methods shown in FIGS. 7–13 can also be applied in the same way as described above.

According to the present invention described above, a plurality of fins are formed on the inner surface of a passage for a fluid, such as cooling water, so as to extend in the lengthwise direction thereof and project inwardly from the same inner surface. This enables the area of the inner surface of the passage to be increased greatly, and the cooling or heating efficiency to be thereby improved to a great extent.

Since the fins are formed so as to extend spirally in the lengthwise direction, the cooling or heating fluid flowing in the passage is also turned spirally. Accordingly, the portion of the water which is on the side of the inner surface of a mold body, i.e., on the high-temperature side thereof when the same portion of the water is in a certain part of the water passage is moved to a position which is far from the inner surface of the mold body as the water flows. While the water further flows a certain distance, the mentioned portion of the water is moved again to a position close to the inner surface of the mold body. Since the cooling water flows as it passes such positions alternately and repeatedly, the whole of the fluid, such as cooling water takes part in cooling the high-temperature portions of a mold body which are close to the inner surface thereof. This enables the cooling efficiency to be increased, and the cooling water to flow through the passage smoothly.

If the inner surface of the cooling water passage is made rough, the area of the heat conductive surface increases, so that the heat-conducting effect becomes large.

According to the present invention, complementary members having grooves in the opposite surfaces thereof and consisting of copper or a forged copper alloy, which generally has highly reliable mechanical strength, or a metal box and an aggregate metal, such as metal powder; and a pipe fittable in the above grooves or extending along a space which is to form a passage for the cooling water may be prepared. Therefore, a passage for the cooling water can be made simply and accurately even when it is long or is bent in a complicated manner. According to the present invention, a fin-carrying water passage which cannot possibly be made by a conventional method can be formed easily. Hence, the cooling or heating efficiency can be increased without causing a decrease in the strength of the mold. Moreover, since the forge-rolled copper or copper alloy can be used, the strength of the mold is high, and the reliability thereof can be increased. Also, a suitable wear-resistant material can be attached easily to a desired portion, such as the inner surface of the mold.

I claim:

1. A process for making a heat exchanger comprising:
   inserting a pipe having end portions, into a metal box having an inner surface in such a manner that said pipe is enclosed to form a fluid passage;
   filling a space between said pipe and the inner surface of said metal box with at least one material selected from the group consisting of metal powder, metal particles, metal wires, and metal plates;
   sealing said material in the space; and
   diffusion-welding joint portions of said metal box to each other and peripheral surfaces of said end portions of said pipes to said metal box in an air-tight, vacuum-sealed state by hot isotropic pressure welding.

* * * * *